US008313722B2

(12) United States Patent
Spencer, III et al.

(10) Patent No.: US 8,313,722 B2
(45) Date of Patent: Nov. 20, 2012

(54) PROCESS TO PRODUCE AMMONIA FROM UREA

(75) Inventors: Herbert W. Spencer, III, Valencia, CA (US); H. James Peters, Doylestown, PA (US); William G. Hankins, Sammamish, WA (US); Madoka Fujita, Irvine, CA (US)

(73) Assignee: EC&C Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/963,334

(22) Filed: Dec. 8, 2010

(65) Prior Publication Data

US 2011/0076222 A1    Mar. 31, 2011

Related U.S. Application Data

(63) Continuation of application No. 11/999,952, filed on Dec. 6, 2007, now abandoned.

(51) Int. Cl.
*C01C 1/08* (2006.01)
*C01C 1/02* (2006.01)
*B01D 53/56* (2006.01)

(52) U.S. Cl. .................... 423/358; 423/235; 423/352

(58) Field of Classification Search ............. 423/235, 423/352, 358
See application file for complete search history.

(56) References Cited

U.S. PATENT DOCUMENTS

| 3,826,815 | A | 7/1974 | Mavrovic |
| 3,900,554 | A | 8/1975 | Lyon |
| 3,922,222 | A | 11/1975 | Van Moorsel |
| 4,087,513 | A | 5/1978 | Schell |
| 4,168,299 | A | 9/1979 | Schell |
| 4,220,632 | A | 9/1980 | Pence et al. |
| 4,308,385 | A | 12/1981 | Goorden |

(Continued)

FOREIGN PATENT DOCUMENTS

DE    23 62 887 A    6/1975
(Continued)

OTHER PUBLICATIONS

Mori, et al, "Operating Experience of SCR Systems at EPDC Coal Fired Power Stations", Proceedings of Session 6A of the Joint Symposium on Stationary Combustion NOx Control, United States Environmental Protection Agency and The Electric Power Research Institute, Mar. 6-9, 1989, San Francisco, California.

(Continued)

*Primary Examiner* — Daniel C McCracken
*Assistant Examiner* — Daniel Berns
(74) *Attorney, Agent, or Firm* — Joseph E. Mueth (57) ABSTRACT

In a process for producing ammonia from urea which process comprises:
  (a) heating a liquid phase reaction medium comprising an aqueous solution of urea, or a mixture of urea, containing biuret or ammonium carbamate on site, in a hydrolysis reactor such that a pressurized gaseous ammonia and carbon dioxide-containing product is obtained which is essentially free of urea, biuret, or ammonium carbamate;
  (b) separating the gaseous ammonia and carbon dioxide-containing product from the liquid phase reaction medium at the prevailing pressure;
  (c) retaining the liquid phase reaction medium in the reactor for further conversion to gaseous ammonia and carbon dioxide, and/or recycling at least a portion of the said reaction medium back into the reactor, a urea dissolver, or feed solution to the reactor for further conversion; and
  (d) withdrawing the gaseous ammonia and carbon dioxide-containing product separated in step (b) at a controlled rate to meet varying ammonia demand requirements;
the improvement wherein the operating pressure of said reactor is set or adjusted such that excess water for the reaction is maintained in the reactor and the dew-point of said gaseous ammonia and carbon-dioxide-containing product is below the operating temperature of said reactor.

25 Claims, 9 Drawing Sheets

Ammonia Generation as Function of Temperature.

U.S. PATENT DOCUMENTS

| | | | |
|---|---|---|---|
| 4,327,068 A | 4/1982 | Lagana et al. |
| 4,341,640 A | 7/1982 | Landis |
| 4,410,503 A | 10/1983 | Van Nassau et al. |
| 4,533,364 A | 8/1985 | Altman et al. |
| 4,652,678 A | 3/1987 | Douwes |
| 4,719,092 A | 1/1988 | Bowers |
| 4,751,065 A | 6/1988 | Bowers |
| 4,851,201 A | 7/1989 | Heap et al. |
| 4,906,447 A | 3/1990 | Schwarzenbek |
| 4,927,612 A | 5/1990 | Bowers |
| 5,034,030 A | 7/1991 | Miller et al. |
| 5,047,220 A | 9/1991 | Polcer |
| 5,058,514 A | 10/1991 | Mozes et al. |
| 5,096,599 A | 3/1992 | Granelli |
| 5,098,680 A | 3/1992 | Fellows et al. |
| 5,116,584 A | 5/1992 | Chen et al. |
| 5,118,481 A | 6/1992 | Lyon |
| 5,165,903 A | 11/1992 | Hunt et al. |
| 5,237,939 A | 8/1993 | Spokoyny et al. |
| 5,240,688 A | 8/1993 | Von Harpe et al. |
| 5,252,308 A | 10/1993 | Young |
| 5,270,025 A | 12/1993 | Ho et al. |
| 5,281,403 A | 1/1994 | Jones |
| 5,399,325 A | 3/1995 | von Harpe et al. |
| 5,478,542 A | 12/1995 | Chawla et al. |
| 5,543,123 A | 8/1996 | Hofmann et al. |
| 5,567,226 A | 10/1996 | Lookman et al. |
| 5,827,490 A | 10/1998 | Jones |
| 5,943,865 A | 8/1999 | Cohen |
| 5,976,475 A | 11/1999 | Peter-Hoblyn et al. |
| 5,985,224 A | 11/1999 | Lagana |
| 6,017,503 A | 1/2000 | Kato et al. |
| 6,048,510 A | 4/2000 | Zauderer |
| 6,051,040 A | 4/2000 | Peter-Hoblyn |
| 6,077,491 A | 6/2000 | Cooper et al. |
| 6,093,380 A | 7/2000 | Lagana et al. |
| 6,322,762 B1 | 11/2001 | Cooper et al. |
| 6,436,359 B1 | 8/2002 | Spencer et al. |
| 6,506,350 B2 | 1/2003 | Cooper et al. |
| 6,511,644 B1 | 1/2003 | MacArthur et al. |
| 6,730,280 B2 | 5/2004 | Cooper et al. |
| 6,761,868 B2 | 7/2004 | Brooks et al. |
| 6,887,449 B2 | 5/2005 | Brooks et al. |
| 7,008,603 B2 | 3/2006 | Brooks et al. |
| 7,220,395 B2 | 5/2007 | Cooper et al. |
| 2004/0208813 A1 | 10/2004 | Brooks et al. |

FOREIGN PATENT DOCUMENTS

| | | |
|---|---|---|
| DE | 202 537 A | 9/1983 |
| EP | 0 487 886 A | 6/1992 |
| JP | HEI2-191528 | 7/1990 |
| JP | 02 268811 A | 11/1990 |
| JP | 6165913 | 6/1994 |
| JP | 08-057258 | 3/1996 |
| JP | 08-071372 | 3/1996 |
| JP | 08-281074 | 10/1996 |
| JP | 9173786 | 7/1997 |
| WO | 94/13391 | 6/1994 |
| WO | 98/51402 A | 11/1998 |

OTHER PUBLICATIONS

Kopius-Odink, et al, "The First De-NOx Installation in the Netherlands, A Demonstration Project at EPON—Nijmegen Power Station", Proceedings of Session 6A of the Joint Symposium on Stationary Combustion NOx Control, United States Environmental Protection Agency and The Electric Power Research Institute, Mar. 6-9, 1989, San Francisco, California.

Kempe'S Engineering Year-Book 1991, 96th ed., vol. 2, Morgan-Grampian Book Publishing Co. Ltd., London, England, Steam Table F10/5.

"Ammonia From Urea", SIIRTEC NIGI S.p.A., 2001, Milan, Italy.

Glesmann, et al, "Design and Operation of a Safe Alternative to Anhydrous Ammonia: Urea-Based Ammonia-on-Demand (AOD) at AEP's Gavin Station", U.S. EPA-DOE-EPRI Combined Power Plant Air Pollution Control Symposium, Aug. 20-23, 2001, Chicago, Illinois.

Sugiyama, "Phase Diagram", (2002), visited on Dec. 17, 2009 at gfd-dennou.org/library/oboro/gallery/output/phase/index.html.en.

Walker, et al, "Ammonia-On-Demand—Mature and Reliable Technology", DOE Conference on Selective Catalytic Reduction and Non-Catalytic Reduction for NOx Control, Oct. 2003, Pittsburgh, Pennsylvania.

Walker, et al, "Ammonia-On-Demand Installations at American Electric Power's Clifty Creek and Kyger Creek Plants Provide 100% Availability and Safe Operation", 2003 Conference on Selective Catalytic Reduction and Non-Catalytic Reduction for NOx Control, The National Energy Technology Laboratory, U.S. Department of Energy, Oct. 29-30, 2003, netl.doe.gov/publications/proceedings/03/scr-sncr/scr-sncr03.html.

Miccuci, "Ammogen—A Technology for Generating Ammonia From Urea in DeNOx Plants", SIIRTEC NIGI, S.p.A., Sep. 2005, Milan, Italy.

"Pressure and Boiling Points of Water", The Engineering Toolbox, (2005), visited on Dec. 17, 2009 at engineeringtoolbox.com/boiling-point-water-d_926.html.

SIIRTEC NIGI, S.p.A., website pages, Oct. 10, 2006, Milan, Italy.

Spencer, et al, "Design Considerations for Generating Ammonia from Urea for NOx Control with SCRs", Proceedings of the A&WMA 100th Annual Conference, Pittsburgh, Pennsylvania, Jun. 26-29, 2007, OCLC: 227005416, ISBN: 9780923204952; 0923204954, Report No. ACE-07-CD.

"Revamping Urea", brochure published by SIIRTEC NIGI S.p.A., Milan, Italy, available to the public 2005.

Lagana, et al, "Power Generation Environmental Issues & Nitrogen Industry: a cross-linked and effective industrial know-how osmosis", Nitrogen 2001 Conference, Feb. 18-21, 2001, Tampa, Florida.

Figure 1 Ammonia Generation as Function of Temperature.

Figure 2  Urea-Carbamate Equilibrium Concentration for a 40%Urea Feed by Raoult's Law Figure 3 Urea-Carbamate Equilibrium Concentration for a 50% Urea Feed by Raoult's Law Figure 4 Dew Points for 40% and 50% Urea Feeds Figure 5 Reactor Internals Figure 6 Process Control Figure 7 Reactor Pressure to be Maintained as Function of Temperature for a 40% Feed Solution Figure 8 Reactor Pressure to be Maintained as Function of Temperature for a 50% Feed Solution Figure 9 Example of Operating Line for Pressure Set Point

PROCESS TO PRODUCE AMMONIA FROM UREA

This application is a continuation of U.S. patent application Ser. No. 11/999,952 filed Dec. 6, 2007, which is incorporated herein by reference in its entirety.

BACKGROUND OF THE INVENTION

1. Field of invention

The process entails feeding an aqueous urea solution to or creating and aqueous urea solution in a hydrolyser (reactor) where it is heated under pressure to produce ammonia gas mixture of ammonia, water and carbon dioxide. In this invention the reactor operating pressures and temperatures are allowed to vary to match ammonia demand requirements. The reactor pressure is set either to vary with ammonia demand or with reactor operating temperature. The operating pressure is varied such that during normal operation the concentration of these gases remains in equilibrium with the composition of the solution in the reactor and equal to the conversion products of the feed composition. In a typical process the feed solution is in range of 40 to 50 weight percent urea to water.

2. Brief Description of Related Technology

Utilities and A/E firms have shown keen interest in technology for urea-to-ammonia conversion. Utilities are increasingly adopting urea as a preferred alternative to anhydrous and aqueous ammonia for their SCR projects, with several major utilities committing to the urea-to-ammonia alternative and many potential users actively evaluating systems for current and future projects. Other processes such as $SO_2$ scrubbing with ammonia are evaluating the use of urea to ammonia. The improvements of this invention make this more feasible by providing the means to significantly reduce the heat requirements for the production of ammonia from urea. Other applications are also evaluating the use of ammonia production to reduce the onsite storage of ammonia.

The development of urea-to-ammonia technologies is in response to the greatly increased requirements for utilities to control NOx emissions and their implementation of SCR projects that require ammonia as the reducing agent. Anhydrous ammonia is regarded as a hazardous and toxic chemical and is subject to stringent regulations imposed by the EPA as well as OSHA. Aqueous ammonia, although less concentrated, poses similar risks, and is also becoming increasingly regulated or subject to restrictions by local authorities. The use of aqueous ammonia as an alternative to anhydrous, significantly increases operating costs for chemical and energy, and increases transport and storage requirements. These disadvantages are exacerbated as more dilute aqueous solutions are considered.

The urea to ammonia and other on demand urea to ammonia system uses urea as the feedstock chemical and thereby entirely avoids risks associated with the transportation and storage of ammonia. The process transforms urea solution to an ammonia gas mixture on demand to meet the dynamic requirements of the NOx control system and other systems using ammonia.

The initial systems were designed for operating temperatures of 300 deg F. and operating pressure of 60 to 80 psig with a urea feed concentration of 40%. Higher urea feed concentrations reduce the operating cost by decreasing the energy required to evaporate the water in the feed solution. As the market matures higher temperature designs and higher 50% urea feed concentrations can reduce the capital cost of the system as well as reduce energy consumption.

Since the rate of hydrolysis of urea is increased with excess water, maintaining adequate water in the reactor liquid is essential to the process. However, for 50% urea feed and above, the potential for ammonia production rate to be slowed because of diminishing water for the reaction must be considered. The Spencer, et al. paper "Design Considerations for Generating Ammonia from Urea for NOx Control with SCRs", AWMA 2007 Conference, showed that the water available for reaction when the reactor is held at a constant pressure decreases with increasing temperature.

Brooks et al. U.S. Pat. No. 6,761,868 describes a means to address the issue by controlling both temperature and pressure. In the instant invention reactor temperature is not controlled and pressure is adjusted as function of ammonia demand or temperature. The Brooks patent does show the pressure and temperature to maintain the concentration in the reactor at the feed concentration but does not show, as shown in this patent application, how the concentration in the reactor can be maintained at a desired value independent of the feed concentration.

Cooper et al. U.S. Pat. No. 6,077,491 discloses a process in which temperature and pressure are maintained by heat to generate a product gas but do not show how to maintain the liquid concentration in the reactor at near constant value.

Neither the Cooper nor the Brooks patents show the advantage of allowing the pressure in the reactor to vary as function of demand or as function of temperature.

A secondary issue is the additional heat needed to maintain higher urea concentration in solution. At 40% urea concentration the requirements for heat tracing of the urea feed system are reduced but reactor energy consumption is increased.

This invention identifies design considerations needed to be taken into account in order to maintain water balance in the reactor. This has the advantage that the product gas composition remains nearly constant during changes in gas production rate. Another of the advantages of the invention is the reactor can be operated such that for all demand conditions the product gas temperature is always above the gas dew point calculations for urea to ammonia generation processes. This result is in less corrosion and longer lasting reactors.

SUMMARY OF THE INVENTION

Briefly, the present invention comprises in a process for producing ammonia from urea, which process comprises:

(a) heating an aqueous solution of urea, or a mixture of urea, containing biuret or ammonium carbamate on site, in a hydrolysis reactor such that a gaseous ammonia-containing product is obtained which is essentially free of urea, biuret, or ammonium carbamate, the temperature and pressure being maintained by the input of heat to the reactor;

(b) separating the gaseous ammonia-containing product from the liquid phase aqueous reaction media at the operating pressure;

(c) retaining the liquid phase reaction medium in the reactor for further conversion to gaseous ammonia and carbon dioxide, and/or recycling at least a portion of the said reaction medium back into the reactor, a urea dissolver, or the feed solution to the reactor for further conversion; and (d) withdrawing the gaseous ammonia and carbon dioxide-containing product separated in step (b) at a controlled rate to meet demand requirements;

the improvement wherein the temperature in the hydrolysis reactor is not controlled but is allowed to vary to match the demand requirement for ammonia and in which the pressure is varied as function of the demand requirement for ammonia or reactor operating temperature.

This invention further comprises in a process for removing nitrogen oxides from a combustion gas stream which process comprises:

(a) heating an aqueous solution of urea, or a mixture of urea, containing biuret or ammonium carbamate on site, in a hydrolysis reactor such that a gaseous ammonia-containing product is obtained which is essentially free of urea, biuret, or ammonium carbamate, the temperature and pressure being maintained by the input of heat to the reactor;

(b) separating the gaseous ammonia-containing product from the liquid phase aqueous reaction media at the operating pressure;

(c) retaining the liquid phase reaction medium in the reactor for further conversion to gaseous ammonia and carbon dioxide, and/or recycling at least a portion of the said reaction medium back into the reactor, a urea dissolver, or the feed solution to the reactor for further conversion;

(d) withdrawing the gaseous ammonia and carbon dioxide-containing product separated in step (b) at a controlled rate; and (e) contacting the gaseous ammonia-containing product with the combustion gas stream at a rate which essentially matches the demand requirement of nitrogen oxides removal in said combustion gas stream;

the improvement wherein the temperature in the hydrolysis reactor is not controlled but is allowed to vary to match the demand requirement for ammonia and in which the pressure is varied as function of the demand requirement for ammonia or reactor operating temperature.

The temperature is matched to the demand requirement for ammonia by regulating the heat added to the hydrolysis reactor. The demand signal from the source of the demand for ammonia such as a chemical reaction consuming ammonia, e.g., a combustion gas stream containing $NO_x$ is used to open and close a restriction on the off take from the reactor to allow for flow of the product gas to match the ammonia demand requirements.

When the demand requirement for ammonia increases, such as when the amount $NO_x$ presented by a combustion gas stream increases, typically a valve in the ammonia gas takeoff line from the hydrolysis reactor is opened to increase the flow of gas. Likewise if there is decrease in demand the valve is closed. An increase in demand for a given operating temperature will cause the pressure in the reactor to decrease and a decrease in demand will cause the pressure to increase.

At this point the heat input into the reactor is increased if the pressure degreases and decreased if the pressure increased. Because of the endothermic nature of the reaction process and heat of water evaporation, a decrease in heat input will decrease the reactor temperature and an increase in heat input will increase the reactor temperature. Prior to this invention, the pressure was maintained at constant value with changes in operating temperature or demand by controlling the heat input to the reactor. In this improved process of this patent application, the pressure is not maintained constant but is adjusted according to the ammonia demand or reactor temperature. In practice, this can be done by establishing a pressure set point. In the prior art, the pressure is maintained constant. But, in the improved process of this invention the pressure set point is changed in relation to the temperature or ammonia demand to maintain the desired or predetermined amount of water in the hydrolysis reactor. The heat input is adjusted to have the reactor pressure match the new set point which then causes the temperature to change. In practice an iterative procedure is developed that results in a nearly constant water balance in the reactor.

The following discussion serves to better illuminate the significance of the improvement provided by this invention.

Water Balance

At an operating temperature of 250 to 400 degrees F. and operating pressure in the range of 30 to 180 psig the concentrations of ammonia and carbon dioxide held in the reactor liquid solution are relatively low. Assuming ideal gas behavior, Raoult's law and Dalton's law can be used to understand the equilibrium of the solution.

Raoult's law states that the vapor pressure of each component in an ideal solution is related to the vapor pressure of the individual component and the mole fraction of the component present in the solution. When the solution is in chemical equilibrium, the total vapor pressure of the solution is:

$$P_{solution} = (P_1)_{pure} X_1 + (P_2)_{pure} X_2 \ldots$$

where $(P_i)_{pure}$ is the vapor pressure of the pure component and $X_i$ is the mole fraction of the component in solution.

For calculating the water balance of the ammonia generation process, the urea and ammonia carbamate dissolved in a reactor solution is treated as has having zero vapor pressure.

Dalton's law states the total pressure of a mixture of gases is the sum of the partial pressures of each gas in the mixture. Dalton's law may be expressed as $P = P_A + P_B + \ldots$, where $P_J$ is the partial pressure of the gas J, and P is the total pressure of the mixture.

The partial pressure is defined as:

$$P_J = y_J P$$

where $y_J$ is the mole fraction of the gas J, the ratio of its amount in moles to the total number of moles of gas molecules present in the mixture. With this definition, the total pressure of a mixture of any kind of gases is the sum of their partial pressures.

$$P_{total} = P_1 + P_2 + P_3 \ldots = y_1 P_{total} + y_2 P_{total} + y_2 P_{total} + \ldots$$

Figure 2:
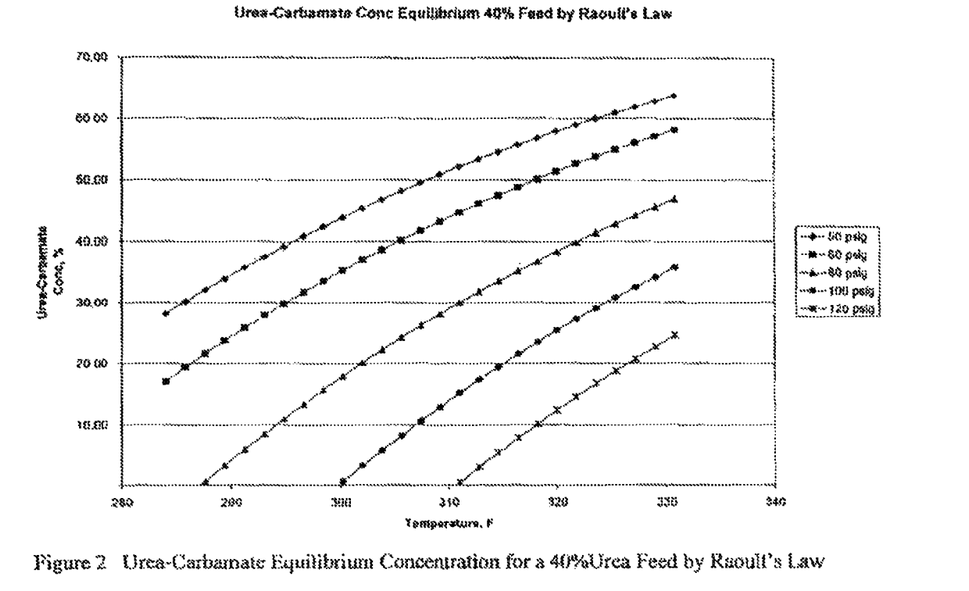
FIGS. 2 and 3 show the urea-carbamate equilibrium concentration for 40 and 50% urea feed solutions.
Figure 3:
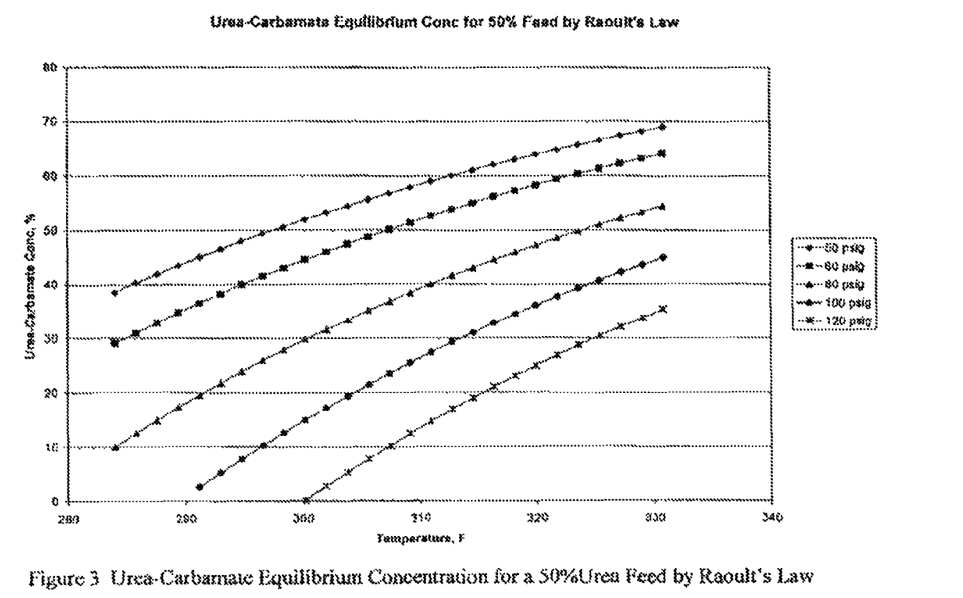

Based on the above, the equilibrium concentration of urea-carbamate in the reactor solution can be estimated over a range of temperature. FIGS. 2 and 3 show the estimated equilibrium urea-carbamate concentration for 40% and 50% urea feed solutions for typical operating pressures and temperatures for a urea to ammonia reactor.

These figures show that as the operating temperature of a reactor is increased the nominal operating pressure must be increased to keep excess water in the reactor in order to continue to promote the hydrolysis reaction.

For urea to ammonia reactors designed to operate at a maximum temperature of 315 deg F. with a 40% urea feed concentration and operating pressure of 60 psig, FIG. 2 shows the urea-carbamate concentration would be approximately 50% of the solution in the reactor. At minimum load (10%) and lower reactor temperatures, the urea-carbamate concentration decreases to approximately 20% for an operating pressure of 60 psig.

In most utility applications in cyclic service the typical control range is from about 33% to 100% load, in which case, the reactor liquor urea-carbamate concentration varies from 38% to 50% and excess water (62% to 50%) is maintained. For the commercial demonstration unit at Allegheny Energy, operated at a constant pressure set point of 80 psig, 36% urea feed and with typical maximum operating temperature of 295 deg F., the urea-carbamate concentration ranged from 15 to 25%. During the first year of operation at another commercial plant the measured concentration of urea, carbamate, and urea-formaldehyde compounds ranged from 44 to 57% operating with temperatures up to 305 deg F. with 40% feed solutions and operating at a constant pressure set point of 60 psi. Both of these units were typical daily cycling boilers and field measurements are in good agreement with the estimated water balance.

At reduced operating pressures, the urea-carbamate concentration will increase while water decreases to the limit of insufficient water. In that case, the rate of the hydrolysis reaction will also decrease and higher temperature operation is needed to maintain ammonia production. For this situation, the reactor operating pressure needs to be increased while also considering the pressure effect on product gas dew point temperature as discussed in the next section.

Urea to Ammonia Reactors: Dew Point

Dew Point Considerations

The urea to ammonia reactor should be set up to operate with a pressure for which the dew point is less than the normal minimum operating temperature, to avoid condensation products which increase general corrosion rates in the system. Corrosion allowances included in the normal design allow for extended operation below the dew point, but it is recommended to maintain operations above the dew point. The operating procedure of this invention allows this to be done for a larger range of operation than could be previously obtained. Phase equilibrium considerations on the $NH_3$—$CO_2$—$H_2O$ gas system allow the determination of a dew point temperature as a function of pressure and concentration as explained below.

Dew Point Estimation for Gaseous Mixtures

The algorithm given below provides a procedure applicable for calculating dew point temperatures for condensation from a gas mixture of $NH_3$—$CO_2$—$H_2O$.

Equations for property estimation are found in the technical literature for $NH_3$—$CO_2$—$H_2O$ and in articles specific for urea production and are valid for a wide range of temperatures and pressures including those experienced in the urea to ammonia system.

For equilibrium of product gas with the reactor liquid, the determination of liquid phase concentrations assumes that the presence of urea, carbamate, and urea formaldehyde species in the liquid does not incorporate additional non-ideality, i.e. a solution of urea in water interacts with ammonia in the same manner as if only water were present in the liquid. To further refine these calculations activity coefficients for urea, and other ionic species in the liquid phase would have to be incorporated.

This algorithm as presented is:

We are given T and y, and must solve for P and x. We start with the equation:

$$x_i y_i P_i^{sat} = y_i \Phi_i P$$

where:
$y_i$ is the concentration of component in the gas phase
$\Phi_i$ the fugacity coefficient of component (function of y, P and T) i in the gas phase
P is the total pressure
$x_i$ is the concentration of component i in the liquid phase
$y_i$ is the activity coefficient (function of x and T), of component i in the liquid phase
$P_i^{sat}$ is the saturation vapor pressure of component i at temperature T.

Figure 4:
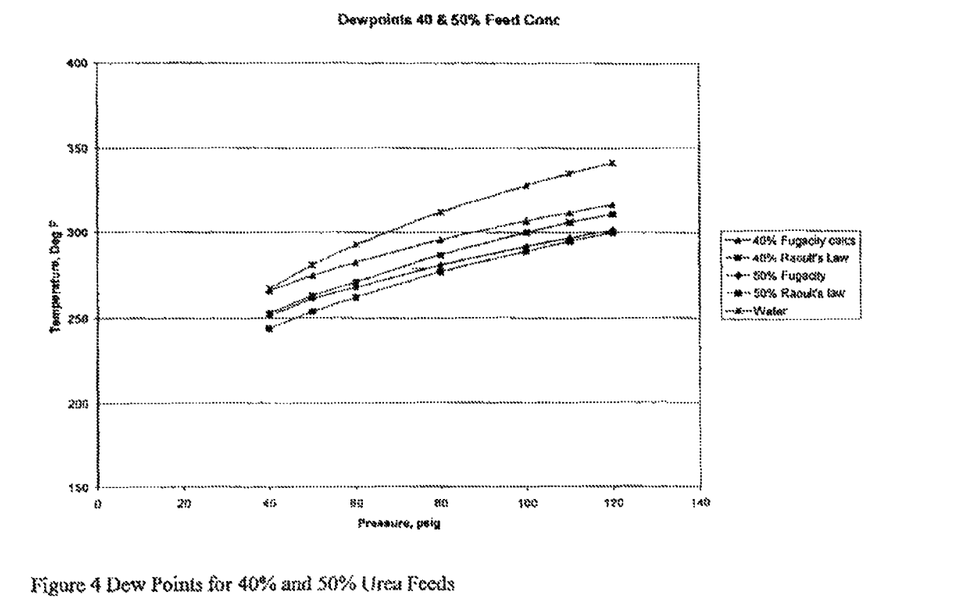
FIG. 4 shows dew points for 40 and 50% feed solutions with and without fugacity. The water dew point line is shown for reference.

$P^{sat}$ is valid only when the components are below their critical state. Since ammonia is above critical temperature and pressure, fugacity equations incorporating $\Phi_i$ have to be used. An iterative solution was developed using MATLAB 6.5 resulting in the data shown in FIG. 4 which contains curves for dew point with and without fugacity (MATLAB 6.5 being with fugacity).

Dew Points without Fugacity

Dew points were also estimated more simply using Raoult's Law without fugacity considerations. The results of both are compared with water dew points in the following FIG. 4. As would be expected the dew points of the UREA TO AMMONIA product take gas are less than pure water. When we consider fugacity to account for the interaction between water, ammonia and carbon dioxide, slightly higher dew points are estimated.

Urea to Ammonia Reactor Operating Environment

Figure 5:
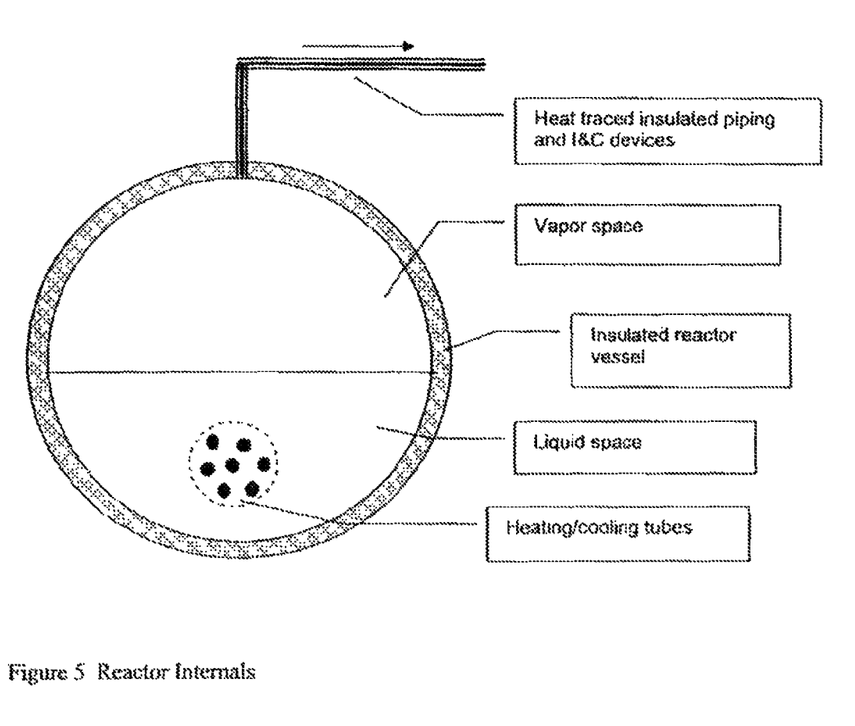
FIG. 5 shows the cross section of a typical reactor.
Figure 6:
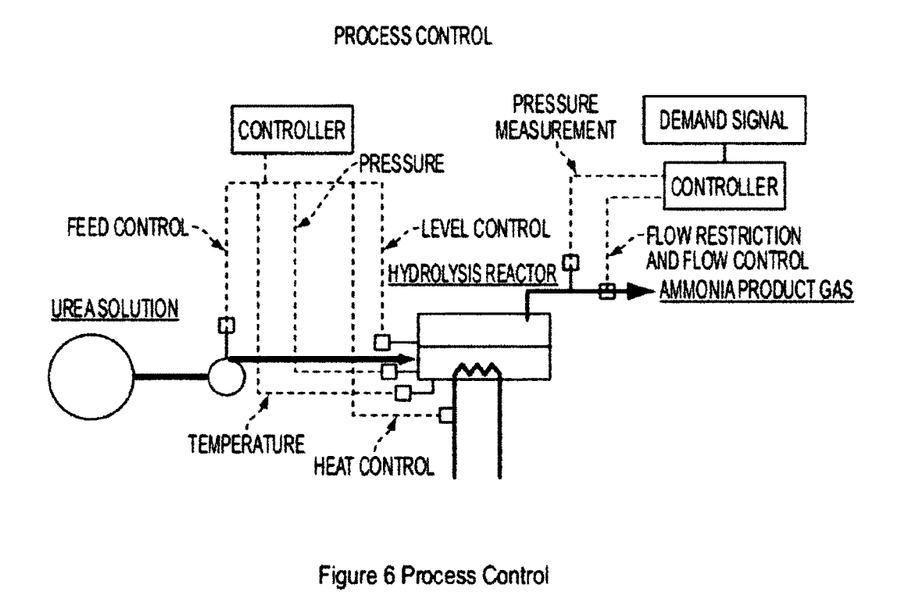
FIG. 6 shows a process control configuration to execute the invention.

Most urea to ammonia reactors operate with a controlled constant liquid level, resulting in a fixed liquid space and vapor space as shown below in FIG. 5. The pressure in the reactor is controlled at nominally 40 to 120 psig while the temperature varies with production rate from 250 to 315° F.

The reactor liquid typically contains from 15-50% urea, 0-18% higher urea derivatives, and 3-6% ammonia. At temperatures above 250° F., any ammonium carbamate in the liquid formed immediately decomposes to ammonia and carbon dioxide and hence very small concentrations (1-2%) of ammonium carbamate will be present in the reactor liquor. The balance is water.

From the chart in FIG. 2, it can be deduced that if the product gas is at 80 psig (for 40% urea solution feed), gas will not condense as long as it is above 296° F. On the other hand, for a 50% urea solution feed, the gas composition is different and this product (at 80 psig) will not begin condensing as long as the temperature is above 275 F.

At low loads, product gas temperatures (250-275° F.) in the reactor can operate below the gas mixture dew points at the operating pressure of 80 psig. In this operating range, a weak ammoniacal solution in water condenses out of the gas stream whenever it comes in contact with colder surfaces. Inspection of reactor internals has shown such liquid condensation stains on the gas-side reactor surface. These condensing vapors on cold surfaces also contribute to the slightly higher corrosion rates on the gas side surfaces and therefore should be minimized where possible by adjusting operating pressures. By using the procedures of this invention the condensation is avoided.

By designing urea to ammonia reactors to operate with gas side conditions to avoid dew points, and with temperatures less than 400 deg F., satisfactory corrosion rates of less than 3 mil/yr have been obtained with 316L SS materials for the reactor vessel and piping, and more specialized materials for some instrumentation and valving due to heat sink considerations. With this invention the range of operation over which corrosion is avoided is increased.

Heat is provided to the reaction process to maintain pressure where the pressure is set as a function of the temperature or the ammonia demand. The pressure can also be set using a demand signal by using the relationship that the temperature of the reactor is a function of the ammonia demand, that is, the temperature T will follow the relationship:

$T=-b/k(\ln(G/A))$ where G is the generation rate (quantity per time) and B, k and A are constants.

Figure 7:
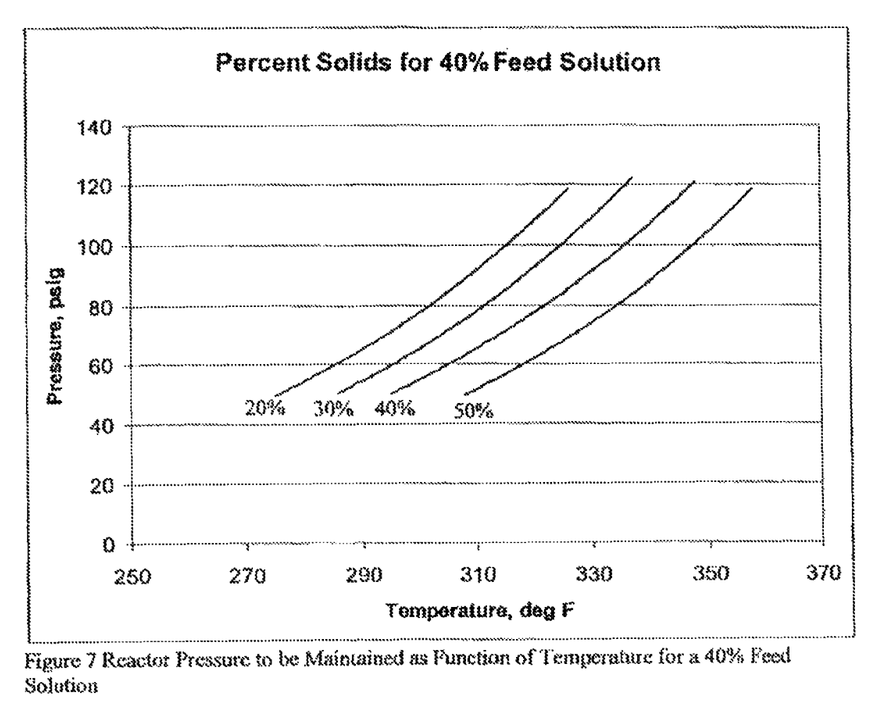
FIGS. 7 and 8 show the pressure needed to maintain a constant 20%, 30%, 40% and 50% concentration in the reactor as a function of temperature for 40% and 50% feed solution.
Figure 8:
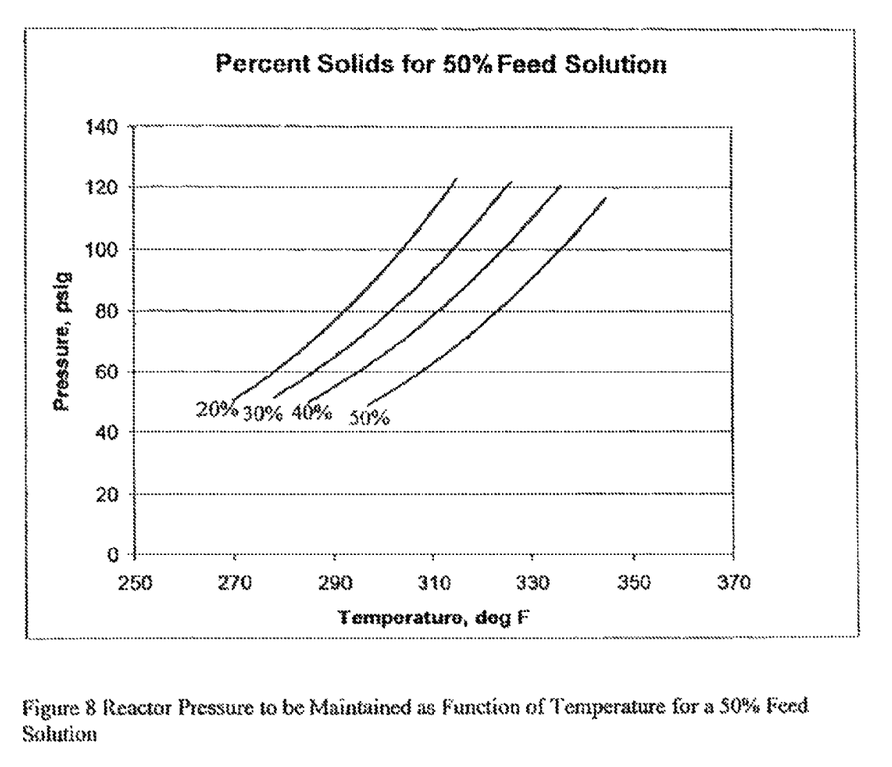

The pressure set point is adjusted per the relationship $P=f(T)$ where the function is selected to maintain a relatively constant concentration of dissolved solids in the reactor. Theoretical relationships of pressure and temperature to maintain a constant solution concentration are shown in FIGS. 7 & 8. The function $f(T)$ can be developed from these curves or from measured concentration as a function of temperature and pressure. Pilot test data showed that operating near the higher solution concentrations give the greater generation for given reactor liquid volume up to a point where the reaction becomes water starved. Any solution greater than 78% will have insufficient water for complete hydrolysis.

DETAILED DESCRIPTION OF THE INVENTION

A urea solution is feed to or created in a hydrolysis reactor and the urea is quantitatively convert to ammonia and carbon dioxide producing an ammonia, carbon dioxide and water vapor product gas that is stoichiometrically equivalent to the converted feed solution. Heat is provided to maintain the temperature and pressure in the reactor. The improvement in the invention is to adjust the pressure in the reactor to be a function of either the generation rate or the temperature in the reactor. The pressure is adjusted in such a way that the excess water in the reactor stays at a relatively uniform value with varying ammonia generation rates with the temperature allowed to adjust to meet the ammonia demand.

The following Examples are for purposes of illustration only.

EXAMPLES

Example 1

In Example 1, a 40% feed solution is feed to the reactor or created in the reactor by feeding urea, concentrated urea, and separate stream of water or steam. (The dry urea is normally prilled and formaldehyde coated.) A heater is provided to heat the solution in the reactor. The heat input is adjusted to maintain the pressure in the reactor at set pressure setting. The pressure setting is initially set at start up a value above 30 psia. Once the reactor is heated up to generate gas at 30 psia, the pressure set point is set to a pressure corresponding to reactor temperature according to the data shown in FIG. 7. This can be done by various means such as table look up or by the means of computing from an equation that fits the data in FIG. 7. A desired dissolved content is selected initially for the process such as 30% (70% water). This will provide a large excess of water to urea and give a low salt out temperature for the solution in the reactor. The reactor off take valve is opened or closed to match the desire ammonia generation rate. The heat input to the reactor is increased or decreased as required to maintain the reactor at the pressure set point. Because higher temperatures are required to produce gas at higher loads more heat will be required to be input with higher demands and the temperature of the reactor will automatically adjusts to maintain the pressure at the pressure set point. As rate of gas withdrawn from the reactor is changed the pressure set point is adjusted to a new value either according to the demand rate or as function of the reactor temperature. As the temperature increases the pressure set point is increased which will cause more heat to be input in to the reactor which will help quickly bring the system to the new higher production rate. When demand decreases, the pressure will start to raise causing heat input to decrease. Heat is used by the process because, the reaction for the process is endothermic and because of evaporation of water. As heat is used the reactor temperature decreases. This will now result in the pressure set point being reduced. Since the set pressure set point is reduced, the control for heat input will further reduce the heat input to the reactor which will further allow the temperature to decrease reducing gas production to match the new demand requirement.

In this example a constant feed concentration is fed or created in the reactor and the temperature of operation of the reactor is allowed to vary to meet the ammonia demand requirements.

There are several advantages to operating by the mode presented in this example. One is that the off take gas composition can remain nearly constant with increases and decrease in the ammonia demand. When a reactor is operated with a constant pressure and constant feed concentration typically there will be excess water in the gas product during a load increase and insufficient water in the product gas during a load decrease until a new water balanced is obtained in the reactor. Only in an incrementally slow change does the water stay in balance with a fixed pressure set point. By allowing the pressure to adjust to match the operating temperature, the gas composition exiting the reactor can be keep at a composition that is at the equilibrium value for the feed concentration being feed or created in the reactor. With this approach, a more constant water balance is maintained in the reactor resulting in a more constant off take gas composition without having to change the feed concentration as described in Brooks, et. al. Changing the feed concentration to match requirements is difficult just because of time and heat requirements to mix and dissolve urea with water.

Another advantage is that a larger dynamic control range is obtained for a given offtake valve. The basic valve flow equation is $Q=K\{\text{right arrow over }(.\text{DELTA}.P)\}$ where Q is the flow rate and .DELTA.P is the pressure drop across the valve and K is a constant associated with the valve coefficient Cr such that K is a function of the valve opening. For an example, for an off take control valve where K can be varied by a factor of 10, the flow rate can only be accurately control over a range of a factor of 10. For example, 100% flow requires a temperature of 311 deg F. to generate the ammonia for the size of reactor that is available, to maintain a 30% water balance a pressure of 80 psig is required per FIG. 7. Now say the demand requirement decreases by factor of 15.7. The flow is now below the control range of the valve. At the new flow rate the temperature and pressure would decrease such that the pressure would be decreased to 30 psig and the temperature to 270 deg F. At 100% flow the K value required is 11.2 at 80 psig. At the reduced flow if the pressure was held at 80 psig a K value of 0.71 would be needed and a different valve would be required. By allowing the pressure to decrease to 30 psig as in the operating mode described in this example, a K value of 1.2 is required which would still be with in the factor 10 of the dynamic range of the valve in this example. In this example, it was assumed the valve was discharging to atmospheric pressure and temperature effects were ignored.

If the demand signal is a feed forward signal such as might be the case for a mobile application, the pressure in the reactor can be measured and the valve opening needed calculated for the desired flow.

Another advantage of the method is ability to always have the product gas temperature above the gas dew point. For example the dew point of the product gas is 296 deg F. at 80 psig for 40% feed solution. As the demand drops, the gas will temperature will drop in this example to 270 deg F., which is below the dew point. This can result in corrosion on the gas side of the reactor. But if the pressure is decreased with demand or reactor temperature as in this example to 30 psig, the product gas which is now at a temperature of 270 deg F. remains above the dew point since the dew point of the product gas with the reduced pressure is now 256 deg F.

Example 2

Figure 1:
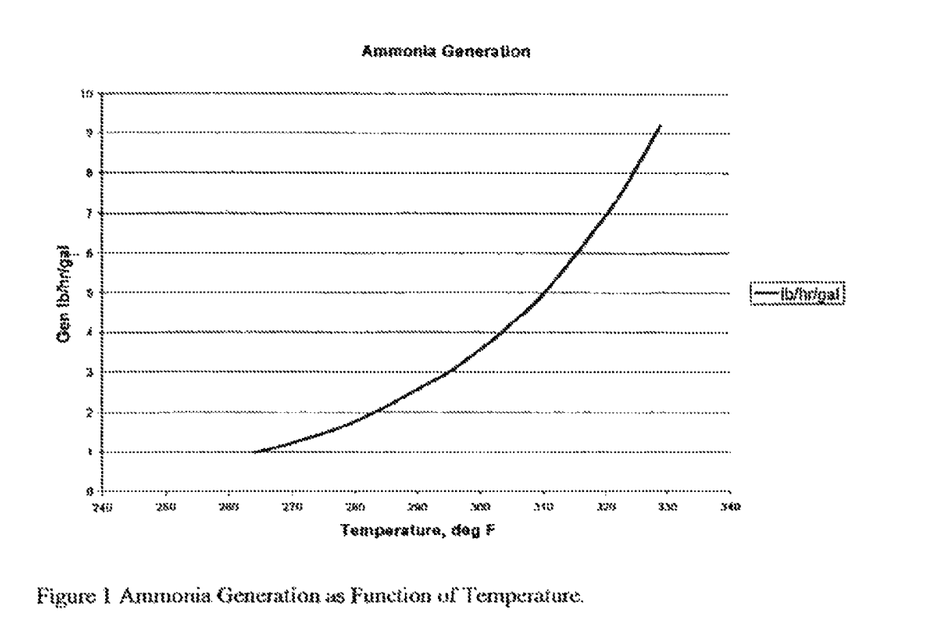
FIG. 1 shows a plot of the ammonia generation rate as a function of temperature and the exponential increase as a function of temperature.

Example 2 is similar to Example 1 except that in this case a pressure ammonia demand load curve is developed from the temperature demand relationship in FIG. 1 and the temperature pressure relationships for constant water balance in the reactor as shown in FIGS. 7 and 8. Note using the procedure described in this patent similar curves and relationships can be developed for other feed concentrations or the relationship for setting the pressure set points as function of temperature or ammonia production rate can be determined by those skilled in the art from measured values of the reactor solution concentration for various pressures and temperatures operating at fixed feed concentration. In practice the operating pressure set point could be manually adjusted for various fixed loads and the reactor solution concentration measured. Density measurement could be used to obtain a measure of the solution concentration. In this example the pressure set point is set by the demand signal instead of the reactor temperature. This has the advantage over the temperature which due the mass of the reactor and liquid in the reactor can lag the demand change. One should note because the reaction process uses heat for the hydrolysis of the urea and the evaporation of water that the reactor temperature follows closely with the demand requirement.

Example 3

Several users of the current technology use a nominal 70% urea solution that is obtain prior to the prilling or granulation process at the urea manufacture. Typically, the 70% is diluted to a 40% to 50% feed concentration. In this Example 3 a 70% feed is feed to reactor. The reactor would be initially charged with water so that an initial filling with 70% with solution would result in an initial solution in the reactor that is say 40% urea. The product off gas will be the equivalent composition of the 70% feed. The reactor pressure is adjusted in this example such that the water balance in the reactor is maintained at a 40% concentration that is lower than the feed concentration. The advantage of this approach is that the heat for evaporating water is significantly reduced. In this case the heat consumption is reduced from 4526 Btu/lb of ammonia produced to 2193 But/lb ammonia. The disadvantage is that the salt out temperature of the 70% feed solution is 133 deg F. compared to 30.5 deg F. for a 40% feed solution. If the feed solution is maintained at a high temperature such as 133 deg F. some of the urea will convert to biuret. Biuret in the reactor feed increases the required operating temperature of the reactor for ammonia production. The relationships shown in FIGS. 7 and 8 show that higher operating pressures are needed to maintain water balance. Operating according to example one would automatically correct the operating pressure to handle higher biuret contents.

Example 4

Figure 9:
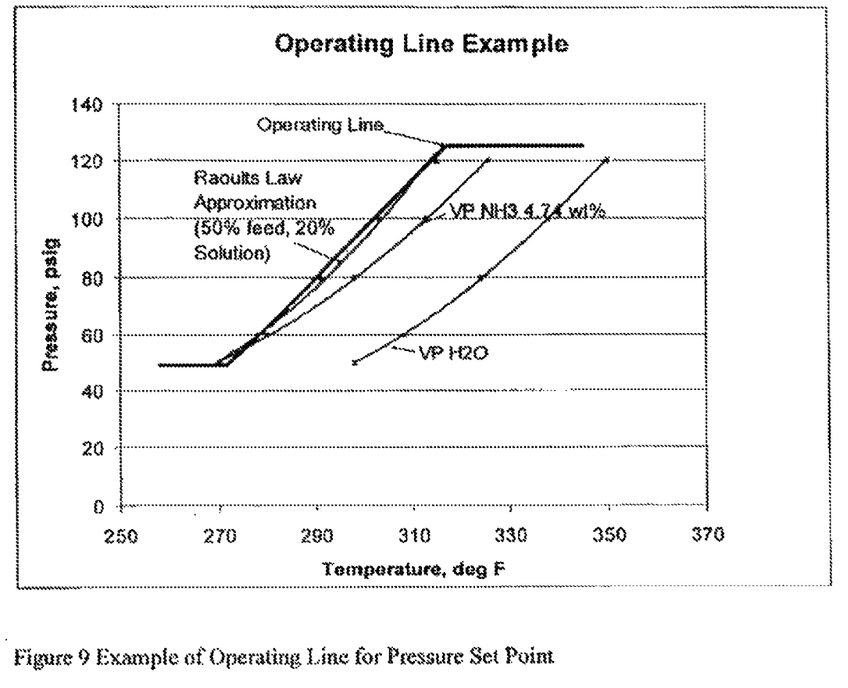
FIG. 9 shows an example of an operating line for pressure set points.

In this Example 4, a simple operating line is shown in FIG. 9. For the example a linear line is shown. A power function could also be used. Four set points are established low pressure (p1) and low temperature (t1) and high pressure (p2) and high temperature (t2) below (t1), pressure is held at (p1) and above (t2) pressure is held at (p2). In between, the pressure set point pressure is a calculated variable between the low and high points. Pset=p1+(p2−p1)*(t−t1)/(t2−t1). Heat is applied to the process to maintain the reactor at the pressure set point. The operating line in this example was selected to follow closely the pressure-temperature relationship developed by Raoult's law to maintain a 20% solution in the reactor. In practice operating data indicates a higher concentration should be maintained to increase reaction rate. Theoretically the solution concentration must be maintained below 76.9% to have sufficient water for complete hydrolysis of the urea in the reactor. In practice a lower concentration must be maintained. Operating data indicates the optimum is in the range of 30 to 50% depending to some extent on urea purity. The operating procedures described in this patent allow an operator to maximize the solution concentration in the reactor and to maintain a nearly constant concentration over a desired ammonia production range. This results in maintaining better control of the fluid equilibrium and water balance than could previously be obtained.

The foregoing description is given for clearness of understanding only, and no unnecessary limitations should be understood therefore, as modifications within the scope of the invention may be apparent to those having ordinary skill in the art.

What is claimed is:

1. A process of removing $NO_x$ from a combustion gas stream using gaseous ammonia by producing ammonia from urea, by a process which comprises:
   (a) heating an aqueous solution of urea, or a mixture of urea, containing biuret or ammonium carbamate on site, in a hydrolysis reactor such that a gaseous ammonia-containing product is obtained which is essentially free of urea, biuret, or ammonium carbamate, the temperature and pressure being maintained by the input of heat to the reactor;
   (b) separating the gaseous ammonia-containing product from the liquid phase aqueous reaction media at the operating pressure;
   (c) retaining the liquid phase reaction medium in the reactor for further conversion to gaseous ammonia and carbon dioxide while feeding additional aqueous solution to the reactor; and
   (d) withdrawing the gaseous ammonia and carbon dioxide-containing product separated in step (b) at a controlled rate to meet ammonia demand requirements for removal of $NO_x$ from a combustion gas stream;

wherein the temperature in the hydrolysis reactor is not controlled but is allowed to vary to match the demand requirement for ammonia and in which the reactor operating pressure is varied as function of the demand requirement for ammonia or reactor operating temperature such that adequate water is maintained in the hydrolysis reactor for hydrolysis of urea, and wherein the equilibrium solution concentration is maintained by a pressure-temperature relationship so that the product gas temperature is always above the dew point of the product gas.

2. A process according to claim 1 wherein the reactor has a take off line for its gaseous ammonia containing product gas equipped with a restrictor valve adapted to open and close to allow for the flow of product gas to match the ammonia demand requirements.

3. A process according to claim 1 wherein the feed solution is in the range of 20 to 72% urea.

4. A process according to claim 1 wherein the solution is created in the reactor by feeding either urea or a concentrated urea and a separate source of water.

5. A process according to claim 1 wherein a solution is withdrawn from the reactor either for use or mixing to make a urea feed solution for the reactor.

6. A process according to claim 1 wherein the operating temperature varies from 110° C. (230° F.) to 288° C. (550° F.).

7. A process according to claim 1 wherein the aqueous solution of urea or mixture of urea does not have formaldehyde or formaldehyde compounds.

8. A process according to claim 1 wherein the aqueous solution of urea or mixture of urea has formaldehyde or formaldehyde compounds.

9. A process of removing $NO_x$ from a combustion gas stream using gaseous ammonia by producing ammonia from urea by a process which comprises:
(a) heating a liquid phase reaction medium comprising an aqueous solution of urea, or a mixture of urea, containing biuret or ammonium carbamate on site, in a hydrolysis reactor such that a pressurized gaseous ammonia and carbon dioxide-containing product is obtained which is essentially free of urea, biuret, or ammonium carbamate;
(b) separating the gaseous ammonia and carbon dioxide-containing product from the liquid phase reaction medium at the prevailing pressure;
(c) retaining the liquid phase reaction medium in the reactor for further conversion to gaseous ammonia and carbon dioxide while feeding additional aqueous solution to the reactor; and
(d) withdrawing the gaseous ammonia and carbon dioxide-containing product gas separated in step (b) at a controlled rate to meet varying ammonia demand requirements for removal of $NO_x$ from a combustion gas stream;
wherein while maintaining the pressure within the reactor in a range between a maximum and a minimum value, the operating pressure is allowed to change within said range to a new set point in response to a change in demand for ammonia, the heat input is adjusted to maintain said pressure set point as the temperature is allowed to vary to match said demand whereby a more constant water balance is maintained in the reactor.

10. A process of claim 9 wherein the solution concentration in the reactor in equilibrium with the product gas is maintained by a pressure-temperature relationship so that the product gas temperature is always above the dew point of the product gas.

11. A process of claim 9 wherein said feed solution is in the range of 20 to 72% urea.

12. A process of claim 9 wherein the solution is created in the reactor by feeding either urea or a concentrated urea and a separate source of water.

13. A process of claim 9 wherein a solution is withdrawn from the reactor either for use or mixing to make a urea feed solution for the reactor.

14. A process of claim 9 wherein the operating temperature varies from 110° C. (230° F.) to 288° C. (550° F.).

15. A process of claim 9 wherein said aqueous solution of urea or mixture of urea does not have formaldehyde or formaldehyde compounds.

16. A process of claim 9 wherein said aqueous solution of urea or mixture of urea has formaldehyde or formaldehyde compounds.

17. A process of removing $NO_x$ from a combustion gas stream using gaseous ammonia by producing ammonia from urea, by a process which comprises:
(a) heating a liquid phase reaction medium comprising an aqueous solution of urea, or a mixture of urea, containing biuret or ammonium carbamate on site, in a hydrolysis reactor such that a pressurized gaseous ammonia and carbon dioxide-containing product is obtained which is essentially free of urea, biuret, or ammonium carbamate;
(b) separating the gaseous ammonia and carbon dioxide-containing product from the liquid phase reaction medium at the prevailing pressure;
(c) retaining the liquid phase reaction medium in the reactor for further conversion to gaseous ammonia and carbon dioxide while feeding additional aqueous solution to the reactor; and
(d) withdrawing the gaseous ammonia and carbon dioxide-containing product gas separated in step (b) at a controlled rate to meet varying ammonia demand requirements for removal of $NO_x$ from a combustion gas stream;
wherein while maintaining the pressure within the reactor in a range between a maximum and a minimum value and the operating pressure is changed within said range to a new set point in relation to the temperature, the heat input is adjusted to maintain the new pressure set point, with the temperature being allowed to adjust to that required to maintain the production rate of the ammonia-containing product gas, and iteratively following this procedure within said range to maintain the desired or predetermined amount of water in said reactor.

18. The process of claim 17 further comprising maintaining the pressure-temperature relationship as a function of the feed concentration and a desired excess of water in the reactor.

19. A process of claim 17 wherein said feed solution is in the range of 20 to 72% urea.

20. A process of claim 17 wherein the solution is created in the reactor by feeding either urea or a concentrated urea and a separate source of water.

21. A process of claim 17 wherein a solution is withdrawn from the reactor either for use or mixing to make a urea feed solution for the reactor.

22. A process of claim 17 wherein the operating temperature varies from 110° C. (230° F.) to 288° C. (550° F.).

23. A process of claim 17 wherein said aqueous solution of urea or mixture of urea does not have formaldehyde or formaldehyde compounds.

24. A process of claim 17 wherein said aqueous solution of urea or mixture of urea has formaldehyde or formaldehyde compounds.

25. A process of removing $NO_x$ from a combustion gas stream using gaseous ammonia by producing ammonia from urea, by a process which comprises:
(a) heating an aqueous solution of urea, or a mixture of urea, containing biuret or ammonium carbamate on site, in a hydrolysis reactor such that a gaseous ammonia-containing product is obtained which is essentially free of urea, biuret, or ammonium carbamate, the temperature and pressure being maintained by the input of heat to the reactor;

(b) separating the gaseous ammonia-containing product from the liquid phase aqueous reaction media at the operating pressure;

(c) retaining the liquid phase reaction medium in the reactor for further conversion to gaseous ammonia and carbon dioxide, and/or recycling at least a portion of the said reaction medium back into the reactor, a urea dissolver, or the feed solution to the reactor for further conversion; and (d) withdrawing the gaseous ammonia and carbon dioxide-containing product gas separated in step (b) at a controlled rate to meet ammonia demand requirements for removal of $NO_x$ from a combustion gas stream;

wherein the operating pressure is selected such that the product gas temperature is always above the product gas dew point, with the pressure being selected as a function of the urea concentration in the reaction medium in said hydrolysis reactor for a product gas containing $CO_2$, $NH_3$ and water vapor.

* * * * *

UNITED STATES PATENT AND TRADEMARK OFFICE
CERTIFICATE OF CORRECTION

PATENT NO. : 8,313,722 B2
APPLICATION NO. : 12/963334
DATED : November 20, 2012
INVENTOR(S) : Herbert W. Spencer, III et al.

Page 1 of 1

It is certified that error appears in the above-identified patent and that said Letters Patent is hereby corrected as shown below:

Column 6, Line 53 should read: From the chart in FIG. ~~2,~~ 4, it can be deduced that if the Signed and Sealed this
Fifth Day of March, 2013

Teresa Stanek Rea
*Acting Director of the United States Patent and Trademark Office*